United States Patent Office 2,938,885
Patented May 31, 1960

---

2,938,885

ASYMMETRIC POLYAMIDES

Joseph A. Blanchette, East Longmeadow, Mass., assignor to Monsanto Chemical Company, St. Louis, Mo., a corporation of Delaware No Drawing. Filed Sept. 23, 1957, Ser. No. 685,402

4 Claims. (Cl. 260—78)

This invention relates to novel synthetic linear polyamides. More particularly, this invention relates to polyamides containing asymmetric carbon atoms.

A wide variety of polyamides are described in the art, ranging from soft and tacky resins to hard and high-melting resins. Such resins have found many important applications, e.g., as synthetic fibers, coatings, wear-resistant machine gears, etc.

Now it is an object of this invention to provide novel polyamides containing asymmetric carbon atoms.

Another object is to provide highly crystalline polyamides possessed of high melting temperatures, good solvent resistance and superior strength.

These and other objects are attained by the condensation polymerization of asymmetric dicarboxylic acids with diamines under sub-atmospheric pressures and at elevated temperatures to produce resinous polyamides having a plurality of recurring units corresponding to the general formula:

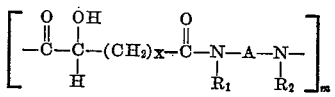

wherein X is an integer of from 1 to 5, $m$ is an integer of at least 10, $R_1$ and $R_2$ are radicals independently selected from the group consisting of hydrogen and alkyl radicals containing 1–3 carbon atoms, and A may be an alkylene, cycloalkylene, arylene and aralkylene radical having a maximum chain length of 9, as hereinafter defined.

The following examples are given in illustration of the invention and are not intended as limitations thereof.

Example I

Twenty grams (0.1 mol) of p,p'-methylenedianiline and 12.5 grams (0.1 mol) of l-malic acid are charged to a vacuum vessel and placed under a vacuum of 100 mm. of mercury. The mixture is heated at 90° C. for about 8 hours or until the evolution of water vapor ceases. The resinous solid formed is dissolved in dimethylformamide and then is precipitated from methanol as pale yellow flakes. After filtration and drying, 30 grams, or a 92.5% yield, of polymer are obtained. This polymer decomposes at above 250° C.

Example II 6.2 grams (0.1 mol) of ethylenediamine and 16.2 grams (0.1 mol) of alpha-hydroxy-butane-1,4-dicarboxylic acid are charged to a vacuum vessel and heated at 80° C. under a 20 mm. of mercury vacuum for about 10 hours. The vacuum then is increased to about 100 mm. of mercury and heating is continued at 80° C. for about another 2 hours or until the evolution of water vapor ceases. The resulting clear sirup is precipitated from methanol. Filtration and drying yield a white crystalline polymer which melts at about 218° C.

As previously mentioned, the resinous polyamides of this invention are the products of the condensation polymerization of substantially equimolar quantities of asymmetric dicarboxylic acids and certain diamines. The asymmetric dicarboxylic acids so employed correspond to the general formula:

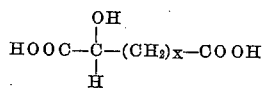

wherein X is an integer of from 1 to 5. By reason of the asymmetric carbon atoms, such dicarboxylic acids are optically active and exist in two stereoisomeric forms, i.e., the "dextro" and "levo"; either, or both, of which may be used either singly or in co-mixture in the practice of this invention. Therefore, this invention encompasses the use of either the d- or l-stereoisomers, or the dl-mixtures thereof, of malic acid, alpha-hydroxy-propane-1,3-dicarboxylic acid, alpha-hydroxy-butane-1,4-dicarboxylic acid, alpha-hydroxy-pentane-1,5-dicarboxylic acid, and alpha-hydroxy-hexane-1,6-dicarboxylic acid and mixtures thereof.

The diamines employed in this invention are primary or secondary alkyl-, cycloalkyl-, aryl-, or aralkyl-diamines corresponding to the general formula:

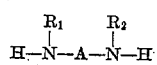

wherein $R_1$ and $R_2$ may be hydrogen or alkyl radicals containing 1 to 3 carbon atoms and need not be the same. A is an alkyl, cycloalkyl, aryl or aralkyl radical having a maximum chain length of 9. As herein used the term chain length is defined as the number of carbon atoms lying in the shortest continuous carbon chain connecting the two nitrogen atoms. For example, the aralkylene diamine, p,p'-methylenediamine,

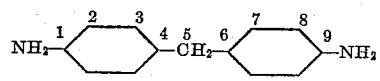

has a chain length of 9, the maximum encompassed by this invention. Similarly, the simplest diamine, methylenediamine, has a chain length of 1. Examples of other diamines which may be used include ethylene diamine, N-ethyl-ethylenediamine, p-phenylenediamine, N,N'-dimethyl-p-phenylenediamine, cyclohexenediamine, N,N'-diisopropyl-cyclopentenediamine, and N,N'-diethyl-p,p'-methylenedianiline. Mixtures of two or more diamines may also be utilized.

The novel resinous polyamides of this invention are prepared from substantially equimolar proportions of the foregoing asymmetric dicarboxylic acids and primary or secondary diamines, many of which are solids at room temperature. Condensation and polymerization may be accomplished in the absence of solvents by maintaining the reactants in a liquid state, i.e., at a temperature above the liquefaction temperature of the highest melting component. However, if desired, the condensation and polymerization may be effected in the presence of an inert organic solvent which is immisible with the water formed during the reaction, e.g., benzene, dimethyl formamide, etc.

Preferably, since the rates of the condensation reaction and of the polymerization are proportional to the temperature of the reaction system, reaction temperatures slightly below, i.e., 5 to 20° C. below, the boiling temperature of the lowest boiling components are employed. Water formed during the reaction must be removed from the reaction system if high polyamide yields are to be obtained. The use of a water immiscible solvent, e.g., benzene, for the reactants and the polyamide product is one way of achieving this result. However, the water may also be removed from solvent-free reaction systems by vacuum distillation techniques. Generally, shorter reaction cycles and better products are obtained when the reaction is run under sub-atmospheric pressures, i.e., 15–150 mm. of mercury vacuum.

The novel polyamides of this invention are prepared in degrees of polymerization of at least 10 units; those polyamides having from 20 to 70 units being especially preferred. As initially obtained, the resinous product is contaminated with small amounts of residual dicarboxylic acid and diamine. To purify, the solid product is first dissolved in organic solvents such as tetrahydrofuran, dimethylformamide, etc., and then is re-precipitated by adding this solution to a large excess of a liquid which is (1) miscible with the solvent (2) a solvent for the dicarboxylic acid and diamine contaminants and (3) is a non-solvent for the polyamide. Examples of such liquids are methanol and water.

The polyamides of this invention are new and highly oriented linear resins possessed of a high degree of crystallinity. They are insoluble in the lower solvents, i.e., alcohols, ethers, ketones, etc., are high melting and have excellent tensile strength.

These polyamides may be used per se or they may be modified by the incorporation of conventional additives such as plasticizers, dyes, etc. They may also be used in combination with other resins, e.g., alkyds, vinyls, diene polymers, etc.

Films may easily be prepared from the lower molecular weight polyamides by conventional film casting techniques. Such films are especially useful in packaging applications, e.g., meats, foodstuffs, clothing, etc. An example of film preparation is as follows:

*Example III*

Ten grams of the polyamide prepared in Example I are dissolved in 100 ml. of tetrahydrofuran together with 0.5 gram of a polyethylene glycol having an average molecular weight of about 400 as plasticizer. After thorough mixing, the sirupy mixture is poured onto a glass plate as a uniform 0.010″ film. The plate is dried in an oven at 80° C. for 20 minutes after which the film is "peeled." The resultant transparent film is insoluble in common solvents, is highly flexible and possesses high strength.

Fibers for textiles, brush bristles, etc. may be similarly prepared by dissolving intermediate molecular weight polyamides in, for example, tetrahydrofuran, and spinning the solution into a water bath according to conventional practices. These polyamides are also useful as molding and coating compositions.

It is obvious that many variations may be made in the product and processes of this invention without departing from the spirit and scope thereof.

What is claimed is:

1. A resinous polyamide containing asymmetric carbon atoms and consisting of a plurality of recurring structural units corresponding to the general formula:

wherein $m$ is an integer of from 10 to 70; $R_1$ and $R_2$ are radicals independently selected from the group consisting of hydrogen and alkyl radicals containing from 1 to 3 carbon atoms and A is a radical selected from the group consisting of alkylene, cycloalkylene, arylene and aralkylene radicals having a maximum chain length of 9; said chain length being the number of carbon atoms lying in the shortest continuous carbon chain connecting the two nitrogen atoms.

2. A resinous polyamide containing asymmetric carbon atoms and consisting of a plurality of recurring structural units corresponding to the formula:

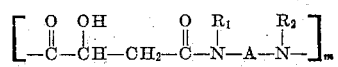

wherein $m$ is an integer of from 10 to 70.

3. A process for preparing resinous polyamides containing asymmetric carbon atoms and consisting of a plurality of recurring structural units corresponding to the general formula:

which comprises heating substantially equimolar proportions of malic acid and a diamine under subatmospheric pressure and at a temperature 5–20° C. below the boiling temperature of the lowest boiling component; said diamine corresponding to the general formula:

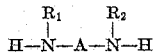

wherein, in each of the above formulae, $m$ is an integer of from 10 to 70; $R_1$ and $R_2$ are radicals independently selected from the group consisting of hydrogen and alkyl radicals containing from 1 to 3 carbon atoms and A is a radical selected from the group consisting of alkylene, cycloalkylene, arylene and aralkylene radicals having a maximum chain length of 9; said chain length being the number of carbon atoms lying in the shortest continuous carbon chain connecting the two nitrogen atoms.

4. A process as in claim 3 wherein the diamine is p,p′-methylenedianiline.

References Cited in the file of this patent
UNITED STATES PATENTS

| | | |
|---|---|---|
| 2,149,273 | Carothers | Mar. 7, 1939 |
| 2,625,536 | Kirby | Jan. 13, 1953 |
| 2,875,059 | Unruh et al. | Feb. 24, 1959 |

FOREIGN PATENTS

| | | |
|---|---|---|
| 988,058 | France | Sept. 23, 1954 |

UNITED STATES PATENT OFFICE
CERTIFICATE OF CORRECTION

Patent No. 2,938,885                                May 31, 1960

Joseph A. Blanchette

It is hereby certified that error appears in the printed specification of the above numbered patent requiring correction and that the said Letters Patent should read as corrected below.

Column 2, line 23, for "alkyl-, cycloalkyl-, aryl-, or aralkyl-" read -- alkylene-, cycloalkylene-, arylene-, or aralkylene- --; line 30, for "alkyl, cycloalkyl, aryl or aralkyl" read -- alkylene, cycloalkylene, arylene or aralkylene --; same column 2, line 35, for "p,p′-methylenediamine" read -- p,p′-methylenedianiline --.

Signed and sealed this 29th day of November 1960.

(SEAL)
Attest:

KARL H. AXLINE                                ROBERT C. WATSON
Attesting Officer                             Commissioner of Patents